United States Patent
Thiam et al.

(10) Patent No.: US 9,501,486 B1
(45) Date of Patent: Nov. 22, 2016

(54) SYSTEMS AND METHODS FOR PREVENTING UNINTENDED DATA LOSS DURING DATA RESTORATION

(75) Inventors: Alioune Thiam, Hugo, MN (US); Guido Westenberg, Columbia Heights, MN (US)

(73) Assignee: Veritas Technologies LLC, Mountain View, CA (US)

( * ) Notice: Subject to any disclaimer, the term of this patent is extended or adjusted under 35 U.S.C. 154(b) by 357 days.

(21) Appl. No.: 13/543,744

(22) Filed: Jul. 6, 2012

(51) Int. Cl.
*G06F 17/30* (2006.01)

(52) U.S. Cl.
CPC .............................. *G06F 17/30088* (2013.01)

(58) Field of Classification Search
CPC ............. G06F 3/065; G06F 17/30088; G06F 17/30371; G06F 17/30233; G06F 17/30575; G06F 17/30073; G06F 17/30156; G06F 17/30212; G06F 17/30215; G06F 17/30312; F06F 2201/84
USPC ........ 707/674, 679, 685, 686; 543/674, 679, 543/685, 686
See application file for complete search history.

(56) References Cited

U.S. PATENT DOCUMENTS

| 5,745,669 | A * | 4/1998 | Hugard et al. ..................... 714/3 |
| 2002/0152181 | A1 * | 10/2002 | Kanai et al. ..................... 705/80 |
| 2004/0172577 | A1 * | 9/2004 | Tan et al. ......................... 714/13 |
| 2004/0267835 | A1 * | 12/2004 | Zwilling ............. G06F 11/1451 |
| 2012/0084523 | A1 * | 4/2012 | Littlefield et al. ............ 711/162 |

OTHER PUBLICATIONS

Song, Henry, Hao-hua Chu, and Shoji Kurakake. "Browser session preservation and migration." Poster Session of WWW (2002): 7-11.*
Green, Russell J., Alasdair C. Baird, and J. Christopher Davies. "Designing a fast, on-line backup system for a log-structured file system." Digital Technical Journal 8 (1996): 32-45.*
Rahumed, Arthur, et al. "A secure cloud backup system with assured deletion and version control." 2011 40th International Conference on Parallel Processing Workshops. IEEE, 2011.*
"CommVault", http://www.commvault.com/, as accessed Apr. 18, 2012, (Dec. 2, 1998).
"EMC", http://www.emc.com/index.htm?fromGlobalSelector, as accessed Apr. 18, 2012, EMC Corporation, (Dec. 14, 2013).
"IBM", http://www.ibm.com/us/en/, as accessed Apr. 18, 2012, (Aug. 16, 2001).

* cited by examiner

*Primary Examiner* — Nan Hutton
(74) *Attorney, Agent, or Firm* — ALG Intellectual Property, LLC

(57) ABSTRACT

A computer-implemented method for preventing unintended data loss during data restoration. The method may include (1) detecting an attempt by a user to restore data to a storage system, (2) analyzing an effect of restoring the data to the storage system on collateral data that was created subsequent to a point in time to which the user is attempting to restore the data, (3) determining, based on the analysis, that restoring the data to the storage system will destroy the collateral data, and (4) enabling, in response to the determination, the user to perform a remedial action on the collateral data before the data is restored in order to prevent unintentional data loss. Various other methods, systems, and computer-readable media are also disclosed.

20 Claims, 6 Drawing Sheets

SYSTEMS AND METHODS FOR PREVENTING UNINTENDED DATA LOSS DURING DATA RESTORATION

BACKGROUND

As enterprises increasingly rely on and store large amounts of data, data restoration has become increasingly important. Today, backup systems use a variety of methods to back up and later restore data that are quick and efficient. For example, a backup system may back up data stored on a storage array by periodically creating a snapshot of at least a portion of the storage array (e.g., a point-in-time representation of data stored on the storage array). The backup system may also back up (e.g., replicate and/or archive) these snapshots to a secondary storage array to protect against failure of the storage array. In this example, the backup system may enable a user to later use a snapshot or backed up snapshot to recover some or all data included within the snapshot.

Unfortunately, the ease by which the user is able to back up and restore data may create situations in which important data is lost because some methods used to restore data may be destructive. For example, using a rollback or a block incremental restore operation to restore data to a storage array from a snapshot may destroy data (e.g., files, directories, other snapshots, etc.) created subsequent to the point in time at which the snapshot used to restore the data was created. Accordingly, the instant disclosure addresses a need for additional and improved systems and methods for preventing unintended data loss during data restoration.

SUMMARY

As will be described in greater detail below, the instant disclosure generally relates to systems and methods for preventing unintended data loss during data restoration by identifying collateral data that may be lost as a result of a user's attempt to restore data, by informing the user that the user's attempt to restore data may result in the loss of the identified collateral data, and by enabling the user to either preserve the collateral data prior to restoring the data or proceed with restoring the data with knowledge that the collateral data will be destroyed. In one example, a computer-implemented method for preventing unintended data loss during data restoration may include (1) detecting an attempt by a user to restore data to a storage system, (2) analyzing an effect of restoring the data to the storage system on collateral data that was created subsequent to a point in time to which the user is attempting to restore the data, (3) determining, based on the analysis, that restoring the data to the storage system will destroy the collateral data, and (4) enabling, in response to the determination, the user to perform a remedial action on the collateral data before the data is restored in order to prevent unintentional data loss.

In some embodiments, the step of enabling the user to perform the remedial action on the collateral data may include (1) informing the user that the collateral data will be destroyed by restoring the data to the storage system and then (2) enabling the user to create a copy of the collateral data, transfer the collateral data to an alternative storage system, restore the data to the storage system using an alternative restoration method that will not destroy the collateral data, abort the attempt to restore the data to the storage system, and/or acknowledge that restoring the data to the storage system will destroy the collateral data.

In certain embodiments, the method may further include (1) detecting that the collateral data was destroyed by restoring the data to the storage system and then (2) deleting, in response to the detection, a backup of the collateral data. In other embodiments, the method may further include (1) receiving from the user, prior to detecting the attempt to restore the data to the storage system, a request to bypass the remedial action and then (2) bypassing, in response to the request, the remedial action on the collateral data.

In at least one embodiment, the step of determining that restoring the data to the storage system will destroy the collateral data may include determining that the collateral data includes indispensable data.

In some embodiments, the step of analyzing the effect of restoring the data to the storage system on the collateral data may include querying the storage system for at least one data object that will be destroyed by restoring the data to the storage system, and the step of determining that restoring the data to the storage system will destroy the collateral data may include receiving, in response to the request, the data object that will be destroyed by restoring the data to the storage system.

In various embodiments, the collateral data may include a file, a directory, and/or a snapshot, and the storage system may include a storage array capable of restoring the data from a snapshot.

In one embodiment, a system for implementing the above-described method may include (1) a detection module programmed to detect an attempt by a user to restore data to a storage system, (2) an analyzing module programmed to analyze an effect of restoring the data to the storage system on collateral data that was created subsequent to a point in time to which the user is attempting to restore the data, (3) a determining module programmed to determine, based on the analysis, that restoring the data to the storage system will destroy the collateral data, (4) a remediating module programmed to enable, in response to the determination, the user to perform a remedial action on the collateral data before the data is restored in order to prevent unintentional data loss, and (5) at least one processor configured to execute the detection module, the analyzing module, the determining module, and the remediating module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) detect an attempt by a user to restore data to a storage system, (2) analyze an effect of restoring the data to the storage system on collateral data that was created subsequent to a point in time to which the user is attempting to restore the data, (3) determine, based on the analysis, that restoring the data to the storage system will destroy the collateral data, and (4) enable, in response to the determination, the user to perform a remedial action on the collateral data before the data is restored in order to prevent unintentional data loss.

As will be explained in greater detail below, by detecting data that may be destroyed by a data restoration operation, the systems and methods described herein may eliminate the possibility that a user unintentionally loses data as a result of an attempt by the user to restore data. Furthermore, in some examples, by identifying collateral data that may be lost as a result of the user's attempt to restore data and by informing the user that the user's attempt to restore data may result in the loss of the identified collateral data, these systems and methods may enable the user to preserve the collateral data prior to restoring the data when loss of the collateral data is unacceptable or proceed with restoring the data without preserving the collateral data when loss of the collateral data is acceptable.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
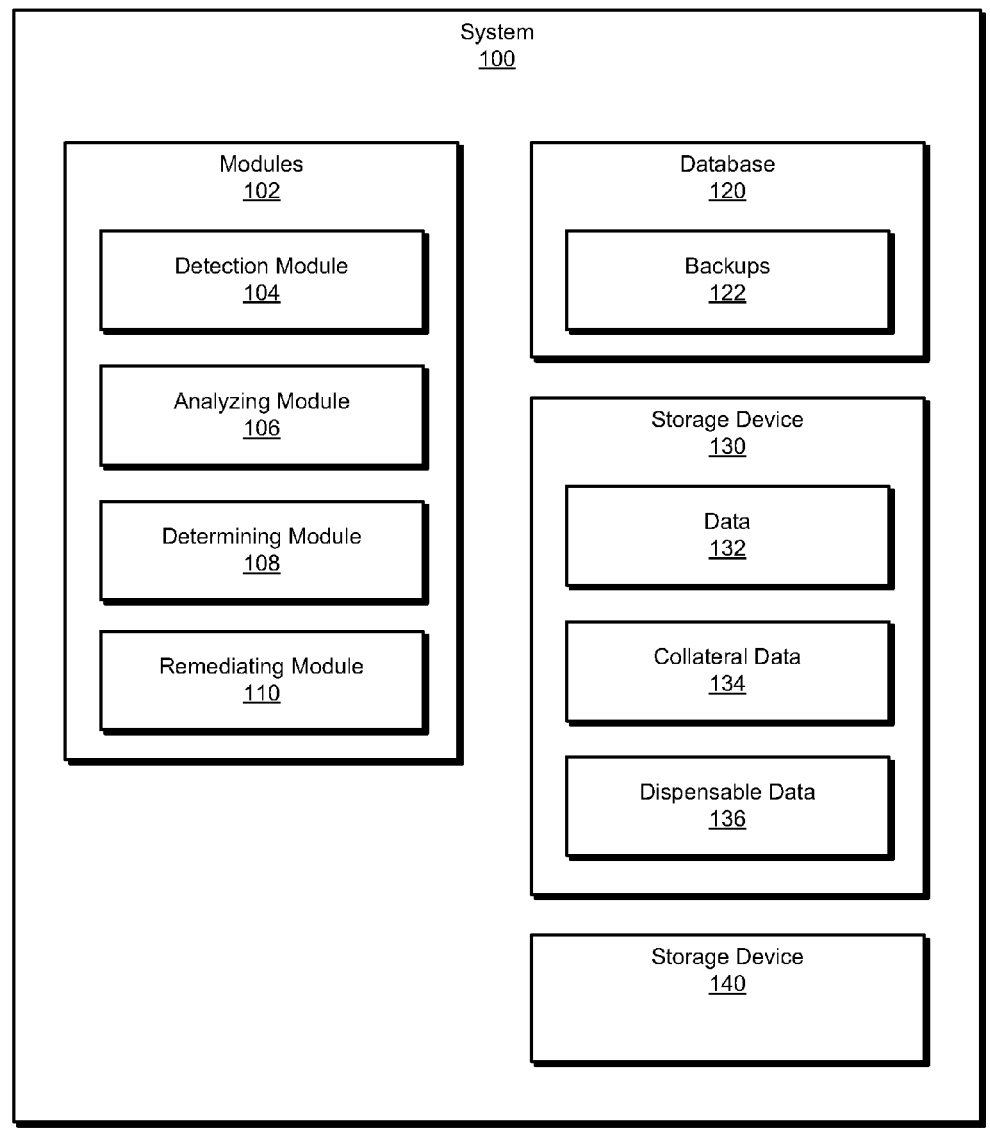
FIG. 1 is a block diagram of an exemplary system for preventing unintended data loss during data restoration.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
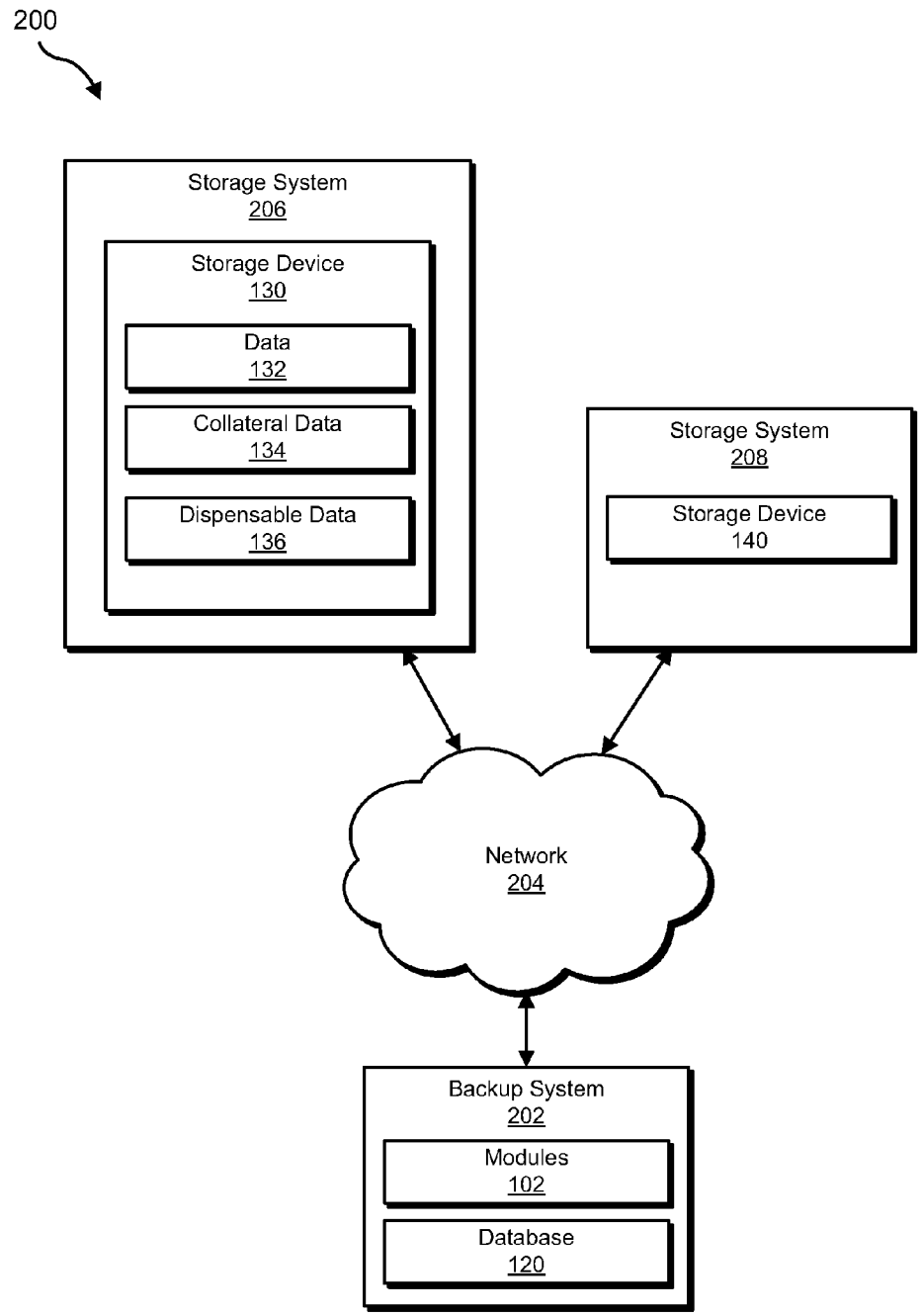
FIG. 2 is a block diagram of an exemplary system for preventing unintended data loss during data restoration.

The following will provide, with reference to FIGS. 1-2, detailed descriptions of exemplary systems for preventing unintended data loss during data restoration. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for preventing unintended data loss during data restoration. As illustrated in this figure, exemplary system 100 may include one or more modules 102 for performing one or more tasks. For example, and as will be explained in greater detail below, exemplary system 100 may include a detection module 104 programmed to detect an attempt by a user to restore data to a storage system. Exemplary system 100 may also include an analyzing module 106 programmed to analyze an effect of restoring the data to the storage system on collateral data that was created subsequent to a point in time to which the user is attempting to restore the data.

In addition, and as will be described in greater detail below, exemplary system 100 may include a determining module 108 programmed to determine that restoring the data to the storage system will destroy the collateral data. Exemplary system 100 may also include a remediating module 110 programmed to enable the user to perform a remedial action on the collateral data before the data is restored in order to prevent unintentional data loss. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., backup system 202, storage system 206, and/or storage system 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. For example, and as will be explained in greater detail below, database 120 may include backups 122 for storing information used to restore data (e.g., information about a source from which data may be restored, such as a backup image or a snapshot).

Database 120 may represent portions of a single database or computing device or a plurality of databases or computing devices. For example, database 120 may represent a portion of backup system 202, storage system 206, and/or storage system 208 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as backup system 202, storage system 206, and/or storage system 208 in FIG. 2, computing system 510 in FIG. 5, and/or portions of exemplary network architecture 600 in FIG. 6.

As illustrated in FIG. 1, exemplary system 100 may further include one or more storage devices, such as storage devices 130 and 140. Storage devices 130 and 140 generally represent any physical or virtual device or system (e.g., primary storage device 532 and backup storage device 533 in FIG. 5 and/or storage devices 660(1)-(N), storage devices 670(1)-(N), storage devices 690(1)-(N), and intelligent storage array 695 in FIG. 6) capable of storing data (e.g., data 132, collateral data 134, and/or dispensable data 136). Data may be stored in storage devices 130 and/or 140 using any suitable data structure or data storage mechanism.

Exemplary system 100 in FIG. 1 may be implemented in a variety of ways. For example, all or a portion of exemplary system 100 may represent portions of exemplary system 200 in FIG. 2. As shown in FIG. 2, system 200 may include a backup system 202, a storage system 206, and a storage system 208 in communication via a network 204.

In one embodiment, one or more of modules 102 from FIG. 1 may, when executed by at least one processor of backup system 202, enable backup system 202 to prevent unintended data loss during data restoration. For example, and as will be described in greater detail below, one or more of modules 102 may cause backup system 202 to (1) detect an attempt by a user to restore data (e.g., data 132) to a storage system (e.g., storage system 206), (2) analyze an effect of restoring the data to the storage system on collateral data (e.g., collateral data 134 and/or dispensable data 136) that was created subsequent to a point in time to which the user is attempting to restore the data, (3) determine, based on the analysis, that restoring the data to the storage system will destroy the collateral data, and (4) enable, in response to the determination, the user to perform a remedial action on the collateral data before the data is restored in order to prevent unintentional data loss.

In one example, one or more of modules 102 from FIG. 1 may, when executed by at least one processor of backup system 202, enable backup system 202 to enable the user to perform the remedial action on the collateral data by enabling the user to transfer the collateral data to an alternative storage system (e.g., storage system 208).

Backup system 202, storage system 206, and storage system 208 generally represent any type or form of computing device capable of reading computer-executable instructions and/or managing and storing data. Examples of backup system 202, storage system 206, and storage system 208 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication and/or data transfer between backup system 202, storage system 206, and/or storage system 208.

Figure 3:
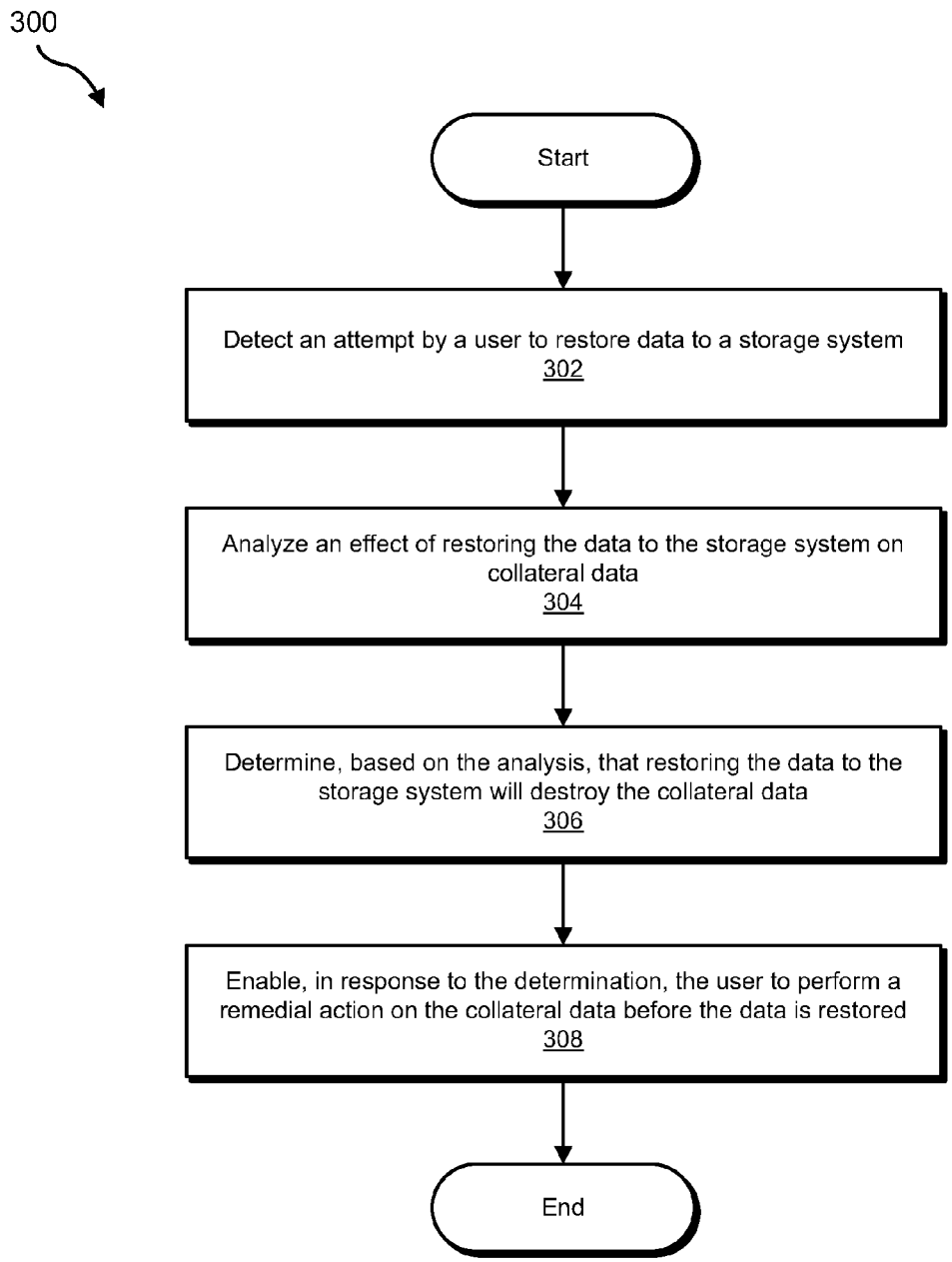
FIG. 3 is a flow diagram of an exemplary method for preventing unintended data loss during data restoration.

FIG. 3 is a flow diagram of an exemplary computer-implemented method 300 for preventing unintended data loss during data restoration. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

Figure 4:
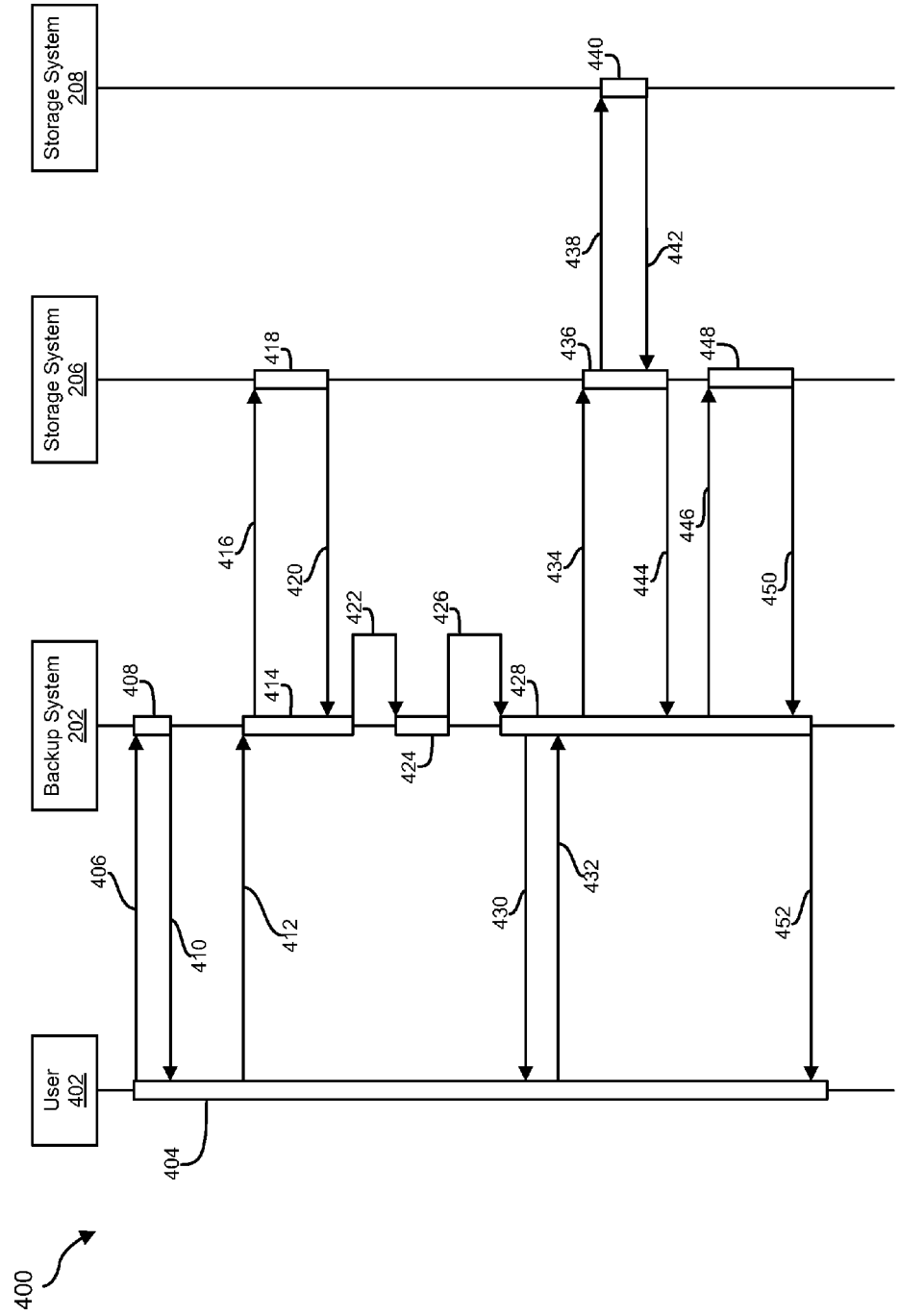
FIG. 4 is an illustration of an exemplary process flow for preventing unintended data loss during data restoration.

The steps shown in FIG. 3 may be implemented in a variety of ways. An example of one implementation is provided in FIG. 4. FIG. 4 is an illustration of an exemplary process flow 400 for preventing unintended data loss during data restoration. Exemplary process flow 400 will be used as an example throughout the following discussion of FIG. 3.

At step 302, one or more of the systems described herein may detect an attempt by a user to restore data to a storage system. For example, at step 302, detection module 104 may, as part of backup system 202 in FIG. 2, detect an attempt by a user (e.g., user 402 in FIG. 4) to restore data 132 to storage system 206.

As used herein, the term "data" may generally refer to any form or representation of data stored on or able to be restored to a storage system. Examples of data may include, without limitation, files, directories, volumes, snapshots, and/or backups.

The systems described herein may perform step 302 in any suitable manner. In one example, detection module 104 may detect the attempt by the user to restore data 132 to storage system 206 by detecting an attempt by the user to recover data 132 from a backup or a snapshot of storage device 130. For example, backup system 202 may have backed up data 132 stored on storage device 130 by periodically creating a snapshot of at least a portion of storage device 130 (e.g., a point-in-time representation of data stored on storage device 130). Backup system 202 may have also backed up (e.g., replicated and/or archived) a copy of these snapshots to a secondary storage system (e.g., storage system 208) to protect against failure of storage system 206 and/or storage device 130. In this example, detection module 104 may detect the attempt by the user to restore data 132 to storage system 206 by detecting an attempt by the user to recover data 132 from one of these snapshots or backups.

FIG. 4 illustrates how detection module 104 may detect an attempt by user 402 to restore data 132 to storage system 206. In this example, user 402 may initiate an attempt to restore data 132 to storage system 206 (step 404) by sending a request to backup system 202 for one or more sources (e.g., backups and/or snapshots containing data 132) from which user 402 may recover data 132 (step 406). In response to this request, backup system 202 may query backups 122 for sources from which user 402 may recover data 132 (step 408) and then respond to the request by providing to user 402 a list of one or more sources from which data 132 may be recovered (step 410). Upon receiving this response from backup system 202, user 402 may send another request to backup system 202 instructing backup system 202 to restore data 132 to storage system 206 (step 412). In this example, detection module 104 may detect the attempt by user 402 to restore data 132 to storage system 206 by detecting one of the requests made at steps 406 or 412.

At step 304, one or more of the systems described herein may analyze an effect of restoring the data to the storage system on collateral data that was created subsequent to a point in time to which the user is attempting to restore the data. For example, at step 304, analyzing module 106 may, as part of backup system 202 in FIG. 2, analyze an effect of restoring data 132 to storage system 206 on collateral data 134 that was created subsequent to the point in time to which the user is attempting to restore data 132.

The systems described herein may perform step 304 in any suitable manner. For example, analyzing module 106 may analyze an effect of restoring data 132 to storage system 206 on collateral data 134 by analyzing whether collateral data 134 will be affected (e.g., overwritten, deleted, made inconsistent, made useless, and/or modified) as a result of restoring data 132 to storage system 206.

In one example, analyzing module 106 may analyze the effect of restoring data 132 to storage system 206 on collateral data 134 by comparing data stored on storage system 206 prior to restoring data 132 with data that will be stored on storage system 206 after restoring data 132 and by determining a difference between the two. For example, analyzing module 106 may determine that a file or directory stored on storage system 206 prior to restoring data 132 will be modified or deleted after restoring data 132.

As used herein, the term "collateral data" may generally refer to any data that was created subsequent to a point in time to which the user is attempting to restore data to a storage system and that may be affected by restoring the data to the storage system. For example, as mentioned above, backup system 202 may have backed up data 132 stored on storage device 130 by creating a snapshot of at least a portion of storage device 130. In this example, any data that was created subsequent to the point in time in which backup system 202 created this snapshot may be affected by restoring data contained within the snapshot. For example, a file or directory created or modified on storage device 130 subsequent to this point in time may be overwritten, deleted, and/or modified as a result of restoring data 132 to storage system 206. Additionally, a snapshot or backup of storage device 130 created subsequent to this point in time may be deleted, made inconsistent, and/or made useless as a result of restoring data 132 to storage system 206.

In some examples, storage system 206 may be capable of restoring data 132 from a snapshot or other mechanism managed by storage system 206. In these examples, analyzing module 106 may analyze the effect of restoring data 132 to storage system 206 on collateral data by querying storage system 206 for at least one data object that will be affected by restoring data 132 to storage system 206. For example, as illustrated in FIG. 4, in response to the request from user 402 to restore data 132 to storage system 206, analyzing module 106 may analyze the effect of restoring data 132 to storage system 206 on collateral data (step 414) by querying storage system 206 for a list of data objects (e.g., files, directories, volumes, or snapshots) that will be affected by restoring data 132 to storage system 206 (step 416). Storage system 206 may then determine whether any data object stored on storage system 206 will be affected by the restoration of data 132 (step 418) and may respond to the request made by backup system 202 with a list of data objects affected by the restoration of data 132 that includes collateral data 134 and dispensable data 136 (step 420). In this example, if analyzing module 106 receives a list of data objects from storage system 206 that is not empty then analyzing module 106 may provide the list to determining module 108 (step 422).

At step 306, one or more of the systems described herein may determine, based on the analysis, that restoring the data to the storage system will destroy the collateral data. For example, at step 306, determining module 108 may, as part of backup system 202 in FIG. 2, determine, based on the analysis performed at step 304, that restoring data 132 to storage system 206 will destroy collateral data 134 and/or dispensable data 136.

The systems described herein may perform step 306 in any suitable manner. In one example, determining module 108 may determine that restoring data 132 to storage system 206 will destroy collateral data 134 and/or dispensable data 136 by determining that collateral data 134 and/or dispensable data 136 will be overwritten, deleted, made inconsistent, made useless, modified, and/or otherwise lost as a result of restoring data 132 to storage system 206. For example, determining module 108 may determine a difference between data stored on storage system 206 prior to restoring data 132 and data that will be stored on storage system 206 after restoring data 132 by comparing the two.

In another example, determining module 108 may determine that restoring data 132 to storage system 206 will destroy collateral data 134 and/or dispensable data 136 by determining that collateral data 134 and/or dispensable data 136 was created subsequent to the point in time to which the user is attempting to restore data 132 to storage system 206. For example, if the user is attempting to restore a volume of storage system 206 to a specified point in time, determining module 108 may determine that any file or directory contained within the volume that was created subsequent to the specified point in time may be destroyed when the volume is restored. In addition, determining module 108 may also determine that any snapshot or backup of the volume that was created subsequent to the specified point in time may be destroyed when the volume is restored.

FIG. 4 illustrates how determining module 108 may determine that collateral data 134 and/or dispensable data 136 will be destroyed as a result of restoring data 132 to storage system 206 (step 424) by determining that the list of data objects received at step 422 contains collateral data 134 and/or dispensable data 136. In this example, if determining module 108 determines that any collateral data will be destroyed as a result of restoring data 132 then determining module 108 may provide a list of the collateral data to remediating module 110 (step 426).

In some instances, restoring data to the storage system may destroy collateral data that includes both indispensable data (e.g., data whose loss would be unacceptable) and dispensable data (e.g., data whose loss would be acceptable). In these instances, determining module 108 may identify dispensable data within the collateral data and then exclude it from the collateral data provided to the user when enabling the user to perform a remedial action on the collateral data. Determining module 108 may identify the dispensable data within the collateral data by identifying temporary data (e.g., temporary files), data that is not crash consistent (e.g., a snapshot that is not crash consistent), and/or any other data that prior to the attempt by the user to restore the data is known to be unneeded by the user.

At step 308, one or more of the systems described herein may enable, in response to the determination, the user to perform a remedial action on the collateral data before the data is restored in order to prevent unintentional data loss. For example, at step 308, remediating module 110 may, as part of backup system 202 in FIG. 2, enable, in response to the determination performed in step 306, the user to perform a remedial action on collateral data 134 before data 132 is restored in order to prevent the unintentional loss of collateral data 134.

The systems described herein may perform step 308 in any suitable manner. In one example, remediating module 110 may (1) inform the user that collateral data 134 will be destroyed by restoring data 132 to storage system 206 and then (2) enable the user to preserve collateral data 134 and/or allow the user to proceed with restoring data 132 to storage system 206. In this example, even though collateral data 134 is destroyed by restoring data 132 to storage system 206 no data will be unintentionally lost.

Remediating module 110 may inform the user that collateral data 134 will be destroyed by displaying to the user information that describes collateral data 134. For example, if collateral data 134 includes a file or a directory, remediating module 110 may display a full path of the file or directory to the user. Similarly, if collateral data 134 includes a snapshot, remediating module 110 may display a backup to which a snapshot is correlated. The user may then use this information to indicate whether the user wishes to perform a remedial action on collateral data 134 or whether the user wishes to proceed with restoring data 132 without performing any remedial action on collateral data 134.

Remediating module 110 may enable the user to preserve collateral data 134 by enabling the user to perform a variety of remedial actions on collateral data 134. For example, remediating module 110 may enable the user to create a copy of collateral data 134, transfer collateral data 134 to an alternative storage system (e.g., storage system 208), restore data 132 to storage system 206 using an alternative restoration method that will not destroy collateral data 134 (e.g., a slower but less destructive data-restoring technique), and/or abort the attempt to restore data 132 to storage system 206.

In some examples, even after being informed that by restoring data 132 to storage system 206 collateral data 134 will be destroyed, the user may still wish to proceed with restoring data 132 without performing any remedial action on collateral data 134. In this instance, remediating module 110 may allowing the user to proceed with restoring data 132 in a way that prevents unintentional data loss by enabling the user to acknowledge that restoring data 132 to storage system 206 will destroy collateral data 134.

The following example, illustrated in FIG. 4, describes how remediating module 110 may enable user 402 attempting to restore data 132 to storage system 206 to preserve collateral data 134 by transferring collateral data 134 to storage system 208 prior to restoring data 132 to storage system 206 (step 428). As shown in FIG. 4, in response to the determination that restoring data 132 to storage system 206 will destroy collateral data 134, remediating module 110 may inform user 402 that collateral data 134 will be destroyed and may enable user 402 to select a remedial action to perform on collateral data 134 (step 430). In this example, user 402 may request that backup system 202 transfer collateral data 134 to storage system 208 before restoring data 132 to storage system 206 (step 432).

Upon receiving the request to transfer collateral data 134 to storage system 208, remediating module 110 may instruct storage system 206 to transfer collateral data 134 to storage system 208 (step 434). In response to this instruction, storage system 206 may begin the transfer of collateral data 134 (step 436) by sending collateral data 134 to storage system 208 (step 438). After storage system 208 receives and stores collateral data 134 to storage device 140 (step 440), storage system 208 may send a confirmation message to storage system 206 indicating that collateral data 134 has been successfully transferred to storage system 208 (step 442), after which storage system 206 may relay the confirmation message to backup system 202 (step 444).

Upon receiving the confirmation message from storage system 206, remediating module 110 may allow data 132 to be restored to storage system 206 by requesting that storage system 206 restore data 132 (e.g., from a snapshot maintained by storage system 206) (step 446). In response to the request, storage system 206 may restore data 132 (step 448) and may send a confirmation message to backup system 202 indicating that data 132 was successfully restored and/or that collateral data 134 was destroyed (step 450).

Finally after receiving the confirmation from storage system 206, remediating module 110 may inform user 402 that collateral data 134 was preserved by transferring collateral data 134 to storage system 208 and/or that data 132 was restored to storage system 206 (step 452). Upon completion of step 308, exemplary method 300 in FIG. 3 may terminate.

In some instances, collateral data 134 may include a snapshot that has been replicated and/or archived. Typically when a snapshot of a storage system is created a backup of the snapshot is also created by replicating or archiving the snapshot to an alternate location. When the backup of the snapshot is created, the relationship between the snapshot to the backup may be tracked by recording the relationship to backups 122. For this reason, remediating module 110 may need to update backups 122 and/or delete any backups associated with collateral data 134 in response to the destruction of collateral data 134.

In other instances, a user may not need or want to perform a remedial action on collateral data. For example, a user may know what collateral data will be destroyed by restoring data to a storage system or may be required to restore the data despite the risk of unintentionally losing collateral data. For this reason, remediating module 110 may enable a user to indicate that the user wishes not to perform a remedial action on collateral data but rather force the restoration of data. For example, remediating module 110 may receive from a user a request to bypass remedial actions on collateral data prior to detecting an attempt to restore data to a storage system and as a result bypass any remedial action on collateral data during subsequent attempts to restore data to the storage system.

As explained above, by detecting data that may be destroyed by a data restoration operation, the systems and methods described herein may eliminate the possibility that a user unintentionally loses data as a result of an attempt by the user to restore data. Furthermore, in some examples, by identifying collateral data that may be lost as a result of the user's attempt to restore data and by informing the user that the user's attempt to restore data may result in the loss of the identified collateral data, these systems and methods may enable the user to preserve the collateral data prior to restoring the data when loss of the collateral data is unacceptable or proceed with restoring the data without preserving the collateral data when loss of the collateral data is acceptable.

Figure 5:
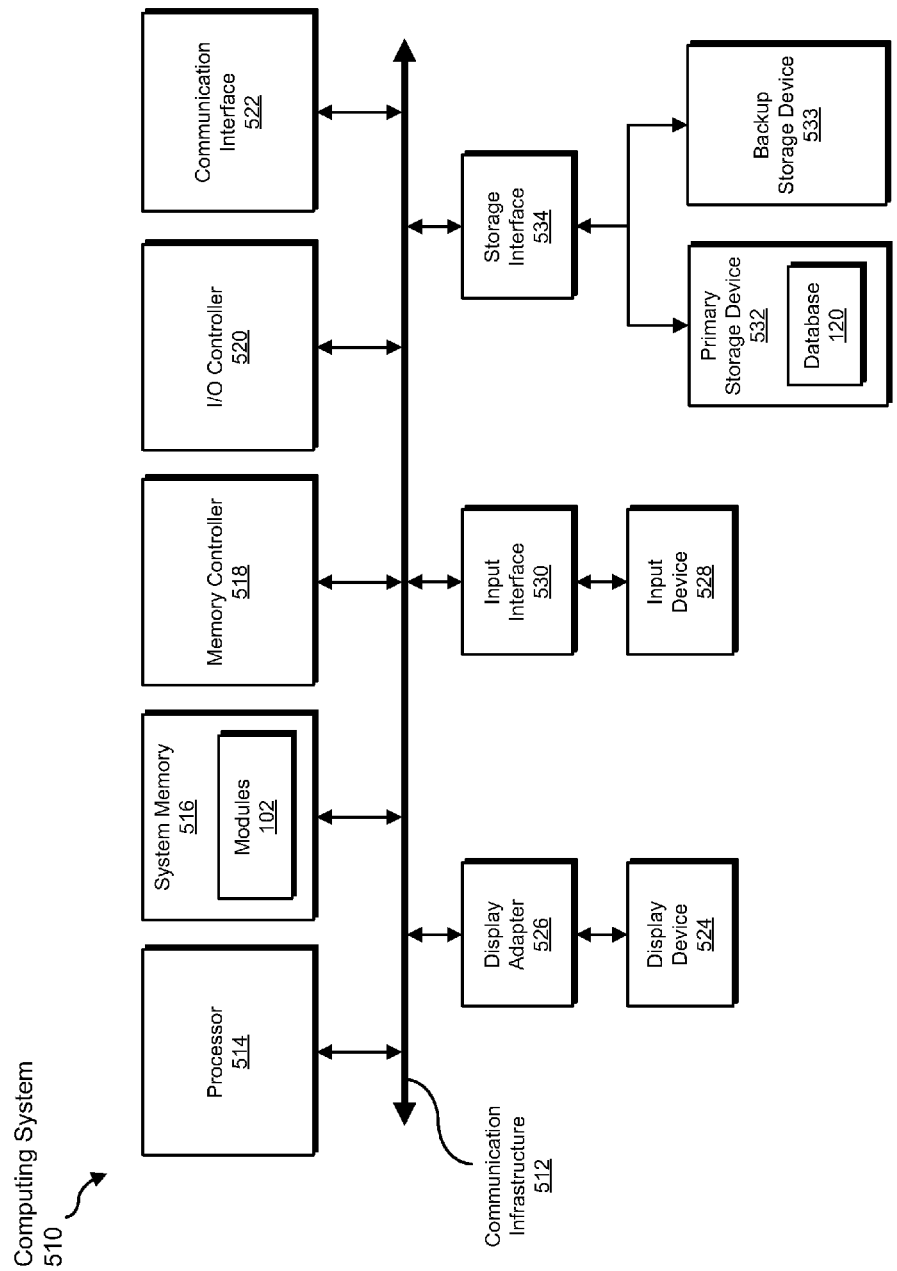
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the preventing, detecting, analyzing, determining, enabling, informing, deleting, receiving, bypassing, and querying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
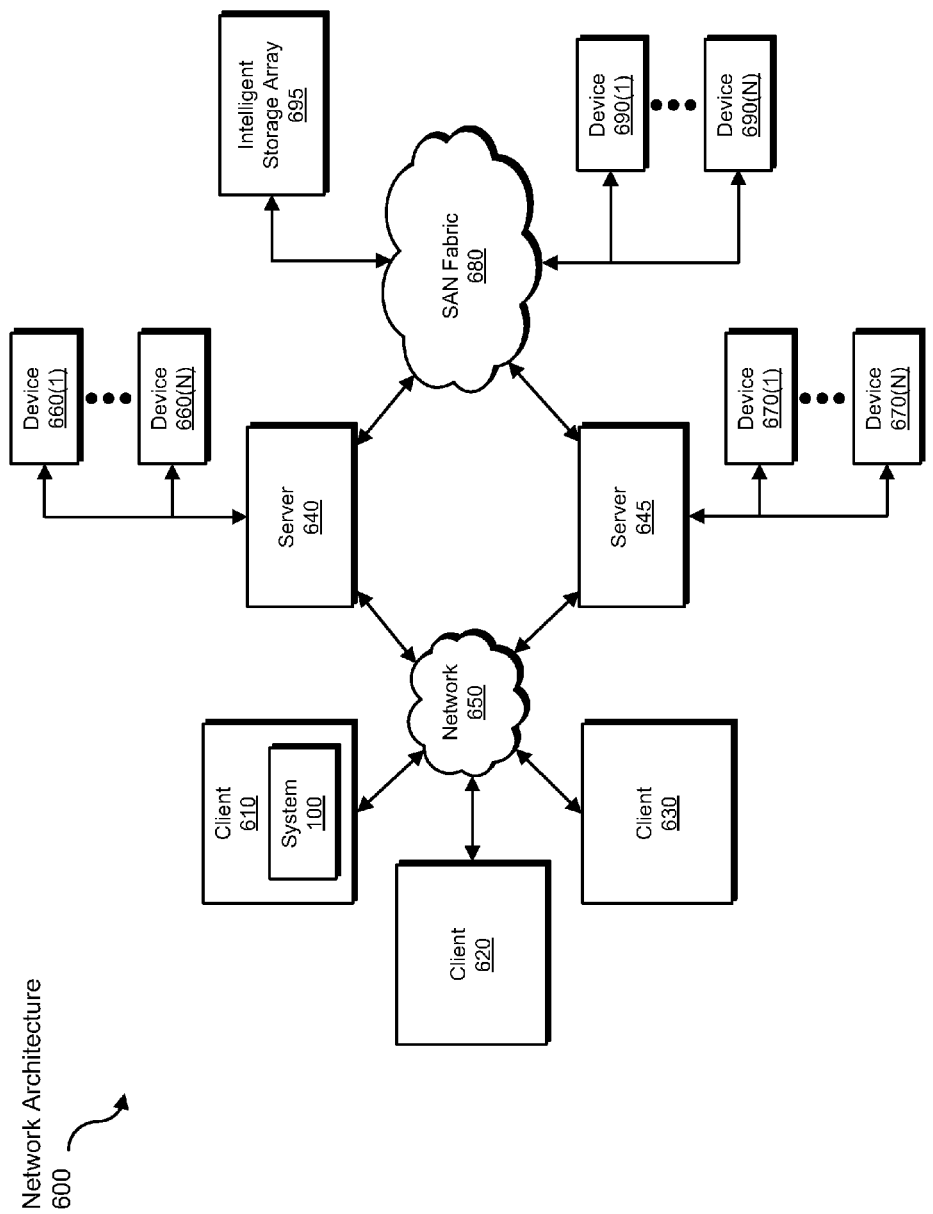
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the preventing, detecting, analyzing, determining, enabling, informing, deleting, receiving, bypassing, and querying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preventing unintended data loss during data restoration.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of preventing unintended data loss during data restoration.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing unintended data loss during data restoration, at least a portion of the method being performed by a computing device comprising at least one processor, the method comprising:
    detecting an attempt by a user to restore data to a storage system;
    analyzing, after detecting the attempt, an effect of restoring the data to the storage system on a collateral backup that was created subsequent to a point in time to which the user is attempting to restore the data, wherein the collateral backup comprises indispensable data;
    determining, based on the analysis, that the user may unintentionally lose the indispensable data by determining that restoring the data to the storage system will destroy an ability to restore the indispensable data from the collateral backup;
    informing, in response to the determination, the user that the ability to restore the indispensable data from the collateral backup will be destroyed by restoring the data to the storage system;
    enabling, after the determination and before the data is restored, the user to perform a remedial action on the collateral backup to preserve the indispensable data in order to prevent unintentional data loss.

2. The method of claim 1, wherein enabling the user to perform the remedial action on the collateral backup comprises enabling the user to perform at least one of:
    create a copy of the indispensable data from the collateral backup;
    transfer the collateral backup to an alternative storage system;
    restore the data to the storage system using an alternative restoration method that will not destroy the ability to restore the indispensable data from the collateral backup;
    abort the attempt to restore the data to the storage system;
    acknowledge that restoring the data to the storage system will destroy the ability to restore the indispensable data from the collateral backup.

3. The method of claim 1, further comprising:
    detecting that the ability to restore the indispensable data from the collateral backup was destroyed by restoring the data to the storage system;
    deleting, in response to the detection, the collateral backup.

4. The method of claim 1, further comprising:
    receiving from the user, prior to detecting the attempt to restore the data to the storage system, a request to bypass the remedial action;
    bypassing, in response to the request, the remedial action on the collateral backup.

5. The method of claim 1, wherein determining that restoring the data to the storage system will destroy the ability to restore the indispensable data from the collateral backup comprises determining that the collateral backup comprises the indispensable data.

6. The method of claim 1, wherein:
    the attempt by the user to restore the data to the storage system is made using a backup system that is separate and distinct from the storage system;
    the steps of detecting, analyzing, determining, informing, and enabling are performed by the backup system;
    the backup system analyzes the effect of restoring the data to the storage system on the collateral backup by querying the storage system for at least one collateral backup that will become useless by restoring the data to the storage system;
    the backup system determines that restoring the data to the storage system will destroy the ability to restore the indispensable data from the collateral backup by receiving, in response to the query, the collateral backup that will become useless by restoring the data to the storage system.

7. The method of claim 1, wherein the collateral backup comprises at least one of:
    a snapshot that was created subsequent to the point in time to which the user is attempting to restore the data;
    a backup that was created subsequent to the point in time to which the user is attempting to restore the data.

8. The method of claim 1, wherein the storage system comprises a storage array capable of restoring the data from a snapshot.

9. A system for preventing unintended data loss during data restoration, the system comprising:
    a detection module programmed to detect an attempt by a user to restore data to a storage system;
    an analyzing module programmed to analyze, after the attempt is detected, an effect of restoring the data to the storage system on a collateral backup that was created subsequent to a point in time to which the user is attempting to restore the data, wherein the collateral backup comprises indispensable data;
a determining module programmed to determine, based on the analysis, that the user may unintentionally lose the indispensable data by determining that restoring the data to the storage system will destroy an ability to restore the indispensable data from the collateral backup;
a remediating module programmed to:
  inform, in response to the determination, the user that the ability to restore the indispensable data from the collateral backup will be destroyed by restoring the data to the storage system;
  enable, after the determination and before the data is restored, the user to perform a remedial action on the collateral backup to preserve the indispensable data in order to prevent unintentional data loss;
at least one processor configured to execute the detection module, the analyzing module, the determining module, and the remediating module.

10. The system of claim 9, wherein the remediating module is programmed to enable the user to perform the remedial action on the collateral backup by enabling the user to perform at least one of:
  create a copy of the indispensable data from the collateral backup;
  transfer the collateral backup to an alternative storage system;
  restore the data to the storage system using an alternative restoration method that will not destroy the ability to restore the indispensable data from the collateral backup;
  abort the attempt to restore the data to the storage system;
  acknowledge that restoring the data to the storage system will destroy the ability to restore the indispensable data from the collateral backup.

11. The system of claim 9, wherein the remediating module is further programmed to:
  detect that the ability to restore the indispensable data from the collateral backup was destroyed by restoring the data to the storage system;
  delete, in response to the detection, the collateral backup.

12. The system of claim 9, wherein the remediating module is further programmed to:
  receive from the user, prior to detecting the attempt to restore the data to the storage system, a request to bypass the remedial action;
  bypass, in response to the request, the remedial action on the collateral backup.

13. The system of claim 9, wherein the determining module is programmed to determine that restoring the data to the storage system will destroy the ability to restore the indispensable data from the collateral backup by determining that the collateral backup comprises the indispensable data.

14. The system of claim 9, wherein:
  the attempt by the user to restore the data to the storage system is made using a backup system that is separate and distinct from the storage system;
  the backup system comprises the detection module, the analyzing module, the determining module, and the remediating module;
  the analyzing module is programmed to analyze, as part of the backup system, the effect of restoring the data to the storage system on the collateral backup by querying the storage system for at least one collateral backup that will become useless by restoring the data to the storage system;
  the determining module is programmed to determine, as part of the backup system, that restoring the data to the storage system will destroy the ability to restore the indispensable data from the collateral backup by receiving, in response to the query, the collateral backup that will become useless by restoring the data to the storage system.

15. The system of claim 9, wherein the collateral backup comprises at least one of:
  a snapshot that was created subsequent to the point in time to which the user is attempting to restore the data;
  a backup that was created subsequent to the point in time to which the user is attempting to restore the data.

16. The system of claim 9, wherein the storage system comprises a storage array capable of restoring the data from a snapshot.

17. A non-transitory computer-readable-storage medium comprising one or more computer-executable instructions that, when executed by at least one processor of a computing device, cause the computing device to:
  detect an attempt by a user to restore data to a storage system;
  analyze, after the attempt is detected, an effect of restoring the data to the storage system on a collateral backup that was created subsequent to a point in time to which the user is attempting to restore the data, wherein the collateral backup comprises indispensable data;
  determine, based on the analysis, that the user may unintentionally lose the indispensable data by determining that restoring the data to the storage system will destroy an ability to restore the indispensable data from the collateral backup;
  inform, in response to the determination, the user that the ability to restore the indispensable data from the collateral backup will be destroyed by restoring the data to the storage system;
  enable, after the determination and before the data is restored, the user to perform a remedial action on the collateral backup to preserve the indispensable data in order to prevent unintentional data loss.

18. The computer-readable-storage medium of claim 17, wherein the one or more computer-executable instructions are programmed to enable the user to perform the remedial action on the collateral backup by enabling the user to perform at least one of:
  create a copy of the indispensable data from the collateral backup;
  transfer the collateral backup to an alternative storage system;
  restore the data to the storage system using an alternative restoration method that will not destroy the ability to restore the indispensable data from the collateral backup;
  abort the attempt to restore the data to the storage system;
  acknowledge that restoring the data to the storage system will destroy the ability to restore the indispensable data from the collateral backup.

19. The computer-readable-storage medium of claim 17, wherein the one or more computer-executable instructions are further programmed to:
  detect that the ability to restore the indispensable data from the collateral backup was destroyed by restoring the data to the storage system;
  delete, in response to the detection, the collateral backup.

20. The computer-readable-storage medium of claim 17, wherein the one or more computer-executable instructions are further programmed to:
- receive from the user, prior to detecting the attempt to restore the data to the storage system, a request to bypass the remedial action;
- bypass, in response to the request, the remedial action on the collateral backup.

\* \* \* \* \*